US009931998B2

(12) United States Patent
Pacheco et al.

(10) Patent No.: US 9,931,998 B2
(45) Date of Patent: Apr. 3, 2018

(54) SELECTABLE WINDOW SWITCH CONTROLLER

(71) Applicant: GM GLOBAL TECHNOLOGY OPERATIONS LLC, Detroit, MI (US)

(72) Inventors: Eleodoro Pacheco, Eastpointe, MI (US); Fred W. Huntzicker, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1097 days.

(21) Appl. No.: 13/937,249

(22) Filed: Jul. 9, 2013

(65) Prior Publication Data
US 2015/0014134 A1    Jan. 15, 2015

(51) Int. Cl.
*H02J 3/14*        (2006.01)
*B60R 16/00*       (2006.01)

(52) U.S. Cl.
CPC .................. *B60R 16/005* (2013.01)

(58) Field of Classification Search
CPC ......................................... H02J 3/14
USPC .......................................... 307/115
See application file for complete search history.

(56) References Cited

U.S. PATENT DOCUMENTS 3,710,050 A * 1/1973 Richards ............... B60J 10/00
                                                180/286
5,813,519 A * 9/1998 Gotoh ................... H01H 15/025
                                                200/313
6,377,009 B1 * 4/2002 Philipp ................. E05F 15/46
                                                318/266
6,903,288 B2 * 6/2005 Varga ..................... H01H 25/04
                                                200/200
7,145,299 B2 * 12/2006 Noro .................... E05F 15/695
                                                307/10.1
2004/0189093 A1   9/2004 Belmond

FOREIGN PATENT DOCUMENTS

| CN | 2543110 Y | 4/2003 |
| CN | 1530261 A | 9/2004 |
| CN | 2799793 Y | 7/2006 |
| CN | 101182748 A | 5/2008 |
| CN | 102518353 A | 6/2012 |
| JP | H08199908 A | 8/1996 |
| JP | 3546674 B2 | 7/2004 |

* cited by examiner

Primary Examiner — Rexford Barnie
Assistant Examiner — Joseph Inge
(74) Attorney, Agent, or Firm — Cantor Colburn LLP

(57) ABSTRACT

A vehicle window control panel for controlling a plurality of vehicle window assemblies comprises a common window control switch and a plurality of selector interfaces. The common window control switch is configured for controlling operation of a window assembly when the window assembly occupies an active state. The plurality of selector interfaces is electrically coupled to the common window control switch, and each of the plurality of selector interfaces is associated with an associated window assembly and configured for selectively coupling the associated window assembly to the common window control switch so as to cause the associated window assembly to occupy an active state. Each of the plurality of selector interfaces is also configured for selectively decoupling the associated window assembly from the common window control switch so as to cause the associated window assembly to occupy an inactive state.

20 Claims, 2 Drawing Sheets

SELECTABLE WINDOW SWITCH CONTROLLER

FIELD OF THE INVENTION

The subject invention relates to vehicle window control panels and more particularly to a vehicle window control panel including a common window control switch with a plurality of selector elements that each correspond to, and activate or inactivate, a window assembly.

BACKGROUND

In today's world, vehicles are often equipped with a master control panel that is accessible by the vehicle operator and that is configured for operating locking, opening, and closing functions of each of the vehicle apertures. For example, control panels positioned for driver actuation may include a common switch for controlling all of the door locks and individual switches for controlling the opening and closing of each of the windows. Separate controls may be provided for opening, closing, and securing the deck lid, a sunroof, rear vent windows, convertible tops, and the like. As the quantity and variety of controlled elements increases and changes from vehicle to vehicle, variations in switch panels must also be introduced. This has resulted in a proliferation of models of switch panels, increasing the cost and complexity of providing such controls across the vehicle fleet and tending to inhibit the provision of switch panels optimized for operator convenience and functionality in all situations.

Conventionally, a panel containing and individual window controller for each of the windows (e.g., four) of the vehicle is provided. Such a widow control panel is often located on the driver's door, and each of the switches is configured similarly to each of the other switches. For example, for vehicles having four windows, four switches are required. Unfortunately, the requirement that four switches be housed on the control panel, coupled with mechanical design constraints imposed by each switch, imposes a minimum size limitation on the control panel, and this minimum size limitation imposes design constraints on adjacent door panel features.

Accordingly, it is desirable to have a vehicle window control panel that addresses these and other disadvantages associated with conventional window control switches and window control panels that incorporate window control switches.

SUMMARY OF THE INVENTION

In an exemplary embodiment of the invention, a vehicle window control panel for controlling a plurality of vehicle window assemblies comprises a common window control switch and a plurality of selector interfaces. The common window control switch is configured for controlling operation of a window assembly when the window assembly occupies an active state. The plurality of selector interfaces is electrically coupled to the common window control switch, and each of the plurality of selector interfaces is associated with an associated window assembly and configured for selectively coupling the associated window assembly to the common window control switch so as to cause the associated window assembly to occupy an active state. Each of the plurality of selector interfaces is also configured for selectively decoupling the associated window assembly from the common window control switch so as to cause the associated window assembly to occupy an inactive state.

In another aspect, an exemplary vehicle comprises a first window assembly, a second window assembly, a common window control switch, a first selector interface, and a second selector interface. The common window control switch is configured for controlling operation of the first window assembly when the first window assembly occupies an active state and the second window assembly when the second window assembly occupies an active state. The first selector interface is electrically coupled to the common window control switch, and is associated with the first window assembly. The first selector interface is configured for selectively coupling the first window assembly to the common window control switch so as to cause the first window assembly to occupy an active state. The first selector interface is also configured for selectively decoupling the first window assembly from the common window control switch so as to cause the first window assembly to occupy an inactive state.

The second selector interface is electrically coupled to the common window control switch and is associated with the second window assembly. The second selector interface is configured for selectively coupling the second window assembly to the common window control switch so as to cause the second window assembly to occupy an active state. The second selector interface is also configured for selectively decoupling the second window assembly from the common window control switch so as to cause the second window assembly to occupy an inactive state.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
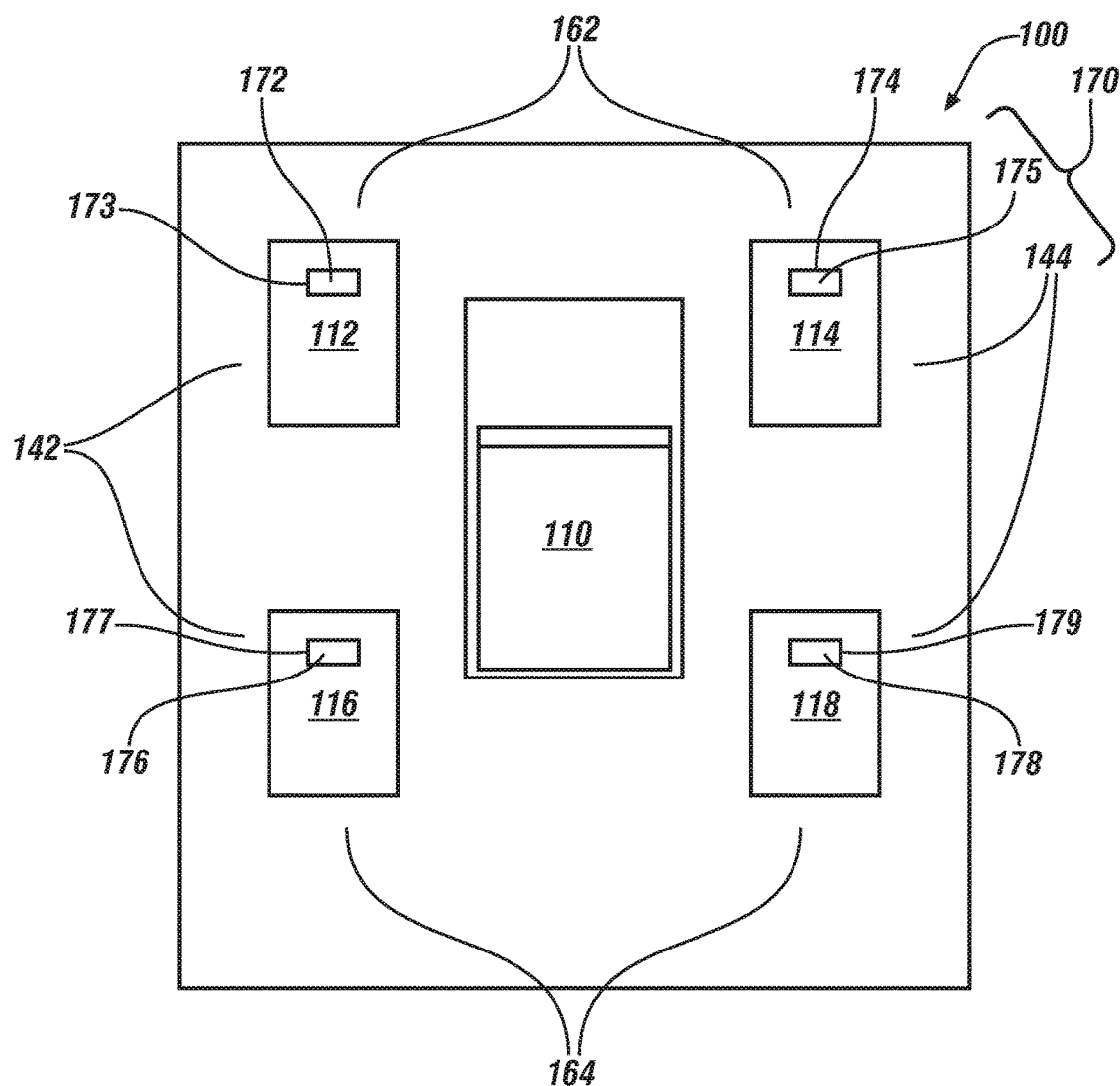
FIG. 1 is a schematic drawing showing an exemplary vehicle window control panel for controlling a plurality of vehicle window assemblies.

The following description is merely exemplary in nature and is not intended to limit the present disclosure, its application or uses. It should be understood that throughout the drawings, corresponding reference numerals indicate like or corresponding parts and features.

Figure 2:
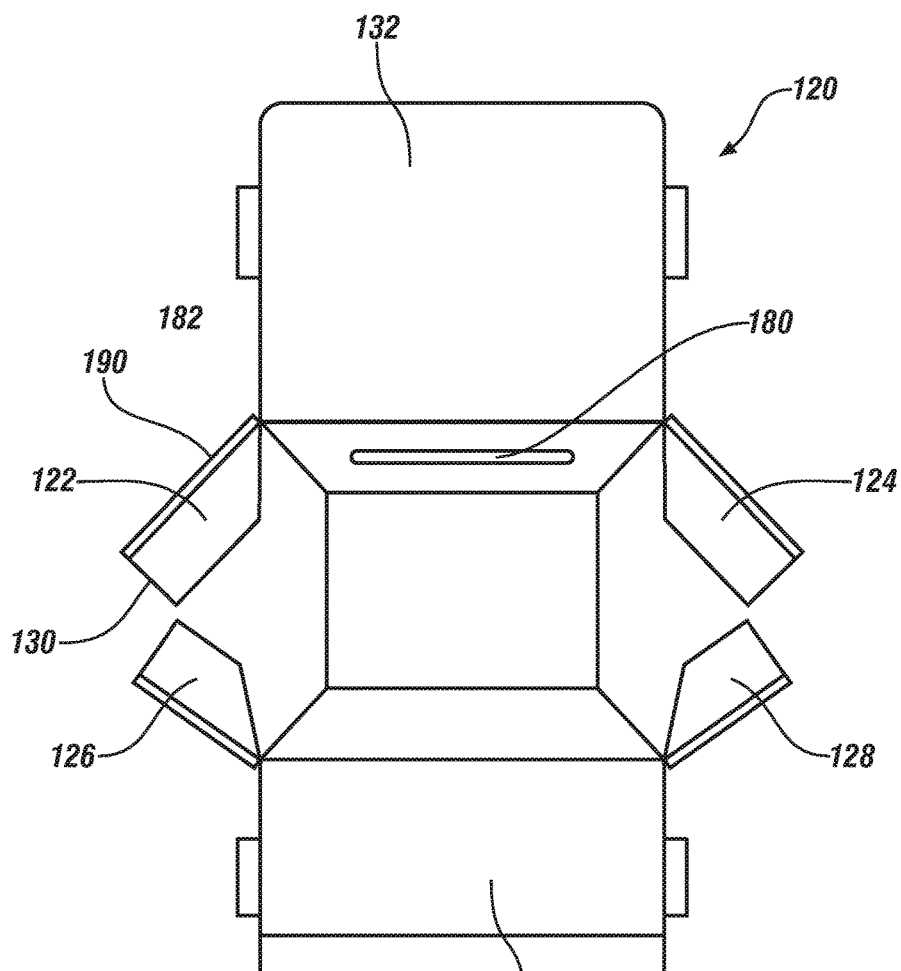
FIG. 2 is a drawing showing an exemplary vehicle comprising a first window assembly, a second window assembly, a third window assembly, and a fourth window assembly.

In accordance with various exemplary embodiments, FIG. 1 shows an exemplary vehicle window control panel 100 for controlling a plurality of vehicle window assemblies (not shown in FIG. 1). As shown in FIG. 1, the control panel 100 includes a common window control switch 110 and a plurality of selector interfaces 112, 114, 116, 118. FIG. 2 shows an exemplary vehicle 120 comprising a first window assembly 122, a second window assembly 124, a third window assembly 126, and a fourth window assembly 128.

It should be appreciated that each of the window assemblies 122, 124, 126, 128 may be powered by a dedicated, motor-powered window regulator (not shown) that may be activated so as to open or close the associated window 130 in response to application of a voltage to the motor of the motor-powered window regulator.

As shown in FIGS. 1 and 2, the common window control switch 110 and the plurality of selector interfaces 112-118 are disposed in the control panel 100, which is mounted in a driver's door 190 of the vehicle 120. The common window control switch 110 is configured for controlling operation of an associated window assembly 122, 124, 126, 128 whenever that window assembly occupies an active state. For example, the common window control switch 110 is configured for controlling operation of the first window assembly 122 when the first window assembly 122 occupies an active state, and the common window control switch 110 is configured for controlling operation of the second window assembly 124 when the second window assembly 124 occupies an active state. Conversely, when either the first window assembly 122 or the second window assembly 124, or any other connected window assembly, is in an inactive state, then actuations of the common window control switch 110 are ineffective to control operation of the inactive window assembly.

In an exemplary embodiment, control over a window assembly 122, 124, 126, 128 may be accomplished by applying a voltage to a motor (not shown) of the window regulator (not shown) such that the window regulator (not shown) moves the window 130 toward an open or closed position. As such, the window assembly 122, 124, 126, 128 may be placed in an active state (i.e., activated) by facilitating the application of the voltage to the motor, and the window assembly 122, 124, 126, 128 may be placed in an inactive state (i.e., inactivated) by preventing the application of a voltage to motor. It should be appreciated, then, that activation (or inactivation) of a window assembly 122, 124, 126, 128 may be accomplished by forming (or interrupting) any necessary electrical or signal coupling between the path through which electricity or another signal (e.g., electromagnetic, light) is to be applied to the motor or through which a signal is to be transmitted to an element in the system that would provide the electricity to the motor.

Thus, in an exemplary embodiment, the first selector interface 112 is electrically coupled to the common window control switch 110 such that the first selector interface 112 is configured, when selected, to enable the common window control switch 110 to be able to apply a voltage to the motor of the first window assembly 122 when the common window control switch 110 is actuated, and the first selector interface 112 is also configured, when de-selected (i.e., not selected), to prevent the common window control switch 110 from being able to apply a voltage to the motor of the first window assembly 122 when the common window control switch 110 is actuated. These functional attributes may be provided by completing or breaking the circuit between the common window control switch 110 and the motor of the first window assembly 122, to which the first selector interface is associated. Put another way, the first selector interface 112 is configured for selectively coupling the first window assembly 122 to the common window control switch 110 so as to cause the first window assembly 122 to occupy an active state, and the first selector interface 112 is also configured for selectively decoupling the first window assembly 122 from the common window control switch 110 so as to cause the first window assembly 122 to occupy an inactive state. The first selector interface 112 toggles between active an inactive states in response to being actuated by the operator.

In an exemplary embodiment, a control panel 100 includes selector interfaces 112-118 for a plurality of window assemblies 122, 124, 126, 128. For example, a control panel 100 for a vehicle 120 having two windows 130 may include two selector interfaces 112, 114. While a control panel 100 may contain selector interfaces 112, 114, 116, 118 for only a subset of the window assemblies 122, 124, 126, 128 in a particular vehicle 120, the control panel 100 may also include a dedicated selector interface for each window assembly of the vehicle 120. Accordingly, in an exemplary embodiment, the second selector interface 114 may be electrically coupled to the common window control switch 110 and may also be associated with the second window assembly 124. In this case, the second selector interface 114 is configured for selectively coupling the second window assembly 124 to the common window control switch 110 so as to cause the second window assembly 124 to occupy an active state, and the second selector interface 114 is also configured for selectively decoupling the second window assembly 124 from the common window control switch 110 so as to cause the second window assembly 124 to occupy an inactive state. The second selector interface 114 toggles between active an inactive states in response to being actuated by the operator.

As discussed above, the common window control switch 110 is configured for controlling operation of a window assembly 122, 124, 126, 128 when the window assembly occupies an active state. In an exemplary embodiment, the common window control switch 110 is a single window lifter switch. Accordingly, the lifter switch may be configured to provide a voltage signal suitable for causing an active window to close when the lifter switch is lifted and to provide a voltage signal suitable for causing the active window to open when the lifter switch is depressed.

To facilitate intuitive operation of the control panel 100, the single common window control switch 110 may be disposed among two or more of selector interfaces 112, 114 in a manner that is similar to the relative positioning of the associated window assemblies 122, 124. Thus, a selector interface 114 that is associated with a right-hand window assembly 124 may be positioned on a right-hand side 144 of the control panel 100 while a selector interface 112, 116 that is associated with a left-hand window assembly 122, 126 may be positioned on a left-hand side 142 of the control panel 100. Similarly, selector interfaces 112, 114 that are associated with a window assemblies 122, 124 positioned toward a front end 132 of the vehicle may be positioned toward a front end 162 of the control panel 100 while selector interfaces 116, 118 that are associated with window assemblies 126, 128 positioned toward a rear end 154 of the vehicle may be positioned toward a rear end 164 of the control panel 100. The common window control switch 110 may then be positioned in a convenient location on the control panel 100 such as centered between the selector interfaces 112, 114, 116, 118 or positioned in another location for convenient operation by the vehicle operator. Put another way, the plurality of selector interfaces 112, 114, 116, 118 may be disposed about the common window control switch 110 so as to form a selector interface layout pattern 170, and the selector interface layout pattern 170 may be similar to an arrangement of the plurality of window assemblies 122, 124, 126, 128 in the vehicle 120.

In an exemplary embodiment, means are provided to enable the vehicle operator to determine which of the associated window assemblies 122, 124, 126, 128 may be active or inactive as a given time. For example, each of the plurality of selector interfaces 112 may comprise an indicator element 172, 174, 176, 178 configured for providing a visual indication of whether the associated window assembly occupies an active state. Accordingly, when the visual indication is provided on a particular selector interface 112, 114, 116, 118, the operator may surmise that the window assembly 122, 124, 126, 128 associated with that selector interface 112, 114, 116, 118 is in an active state. Conversely, when no visual indication is provided on a particular selector interface 112, 114, 116, 118, the operator may surmise that the window assembly 122, 124, 126, 128 associated with that selector interface 112, 114, 116, 118 is in an inactive state. In an alternative embodiment, the indicator elements 172, 174, 176, 178 may be provided in a location apart from the selector interfaces 112, 114, 116, 118. For example, a graphic representation 180 of the window assemblies 122, 124, 126, 128 may be provided on the dashboard 182 or another location, and visual indications (e.g., green symbol for active window assemblies and red symbol for inactive assemblies) may be provided on the graphic representation 180 to indicate the status of each window assembly 122, 124, 126, 128. The indicator elements 172, 174, 176, 178 may comprise a led indicator 173, 175, 177, 179 configured to illuminate when the associated window assembly 122, 124, 126, 128 occupies an active state.

In an exemplary embodiment, a default state may be designated for one or more of the selector interfaces 112, 114, 116, 118. For example, each selector interface of the plurality of selector interfaces may be configured to automatically, following a predetermined period of time, decouple its associated window assembly from the common window control switch 110 so as to cause that decoupled window assembly to occupy an inactive state. Thus the default state for the window assemblies 122, 124, 126, 128 so configured would be inactive. Such a feature may be particularly useful where it is desirable to avoid inadvertent actuation of window assemblies in situations where the common window control switch 110 might be inadvertently actuated.

In another embodiment, recognizing that a vehicle operator might intuitively expect that actuation of the common window control switch 110 would actuate only the driver's window, the default state for the selector interface associated with the driver's window might be an active state while the default state for the remaining selector interfaces might be inactive. Thus, the selector interface for the driver's window would remain active in less manually deactivated while the selector interfaces for the remaining windows would remain inactive unless activated. Still further, following a change in the status of a window from its default state to a different state, following a predetermined period of time, that selector interface may be configured to return the associated window assembly to its default state.

In another exemplary embodiment, a one-touch-all-up mode and/or a one-touch-all-down mode may be provided such that, when the common window control switch 110 is maintained in an actuated position for greater that a predefined length of time, then all available windows may become active so as to be controllable by the actuation of the common window control switch 110. Thus, a state of a pre-defined set of selector interfaces out of the one or more of the selector interfaces 112, 114, 116, 118 may be activated without requiring the operator to activate each of the selector interfaces individually.

For example, each selector interface of the plurality of selector interfaces may be configured to automatically, following actuation of the common window control switch 110 for a predetermined period of time, couple its associated window assembly to the common window control switch 110 so as to cause that newly coupled window assembly to occupy an active state. Thus the state for the set of associated window assemblies would become active upon actuation of the common window control switch 110 for a predetermined period of time. Such a feature may be particularly useful where it is desirable to control all of the windows with the common window control switch 110 such as when entering or exiting a car wash.

In an exemplary embodiment, each selector interface of the plurality of selector interfaces comprises a pressure sensitive touch switch. It should also be appreciated that each selector interface of the plurality of selector interfaces may comprise a capacitive switch, a resistive switch, a mechanical switch, or another type of switch.

Thus, a vehicle 120 may be provided wherein a first window assembly 122 and a second window assembly 124 are provided. In the vehicle 120, a common window control switch 110 may also be provided, wherein the common window control switch 110 is configured for controlling operation of the first window assembly 122 when the first window assembly 122 occupies an active state and for controlling the second window assembly 124 when the second window assembly 124 occupies an active state. A first selector interface 112 may be electrically coupled to the common window control switch 110 and associated with the first window assembly 122. The first selector interface 112 may be configured for selectively coupling the first window assembly 122 to the common window control switch 110 so as to cause the first window assembly 122 to occupy an active state. The first selector interface 112 may also be configured for decoupling the first window assembly 122 from the common window control switch 110 so as to cause the first window assembly 122 to occupy an inactive state.

A second selector interface 114 may be electrically coupled to the common window control switch 110 and associated with the second window assembly 124. Similar to the first selector interface 112, the second selector interface 114 may be configured for selectively coupling the second window assembly 124 to the common window control switch 110 so as to cause the second window assembly 124 to occupy an active state. The second selector interface 114 may be configured for decoupling the second window assembly 124 from the common window control switch 110 so as to cause the second window assembly 124 to occupy an inactive state. It should be appreciated that in this manner, a third window assembly 126 and an associated third selector interface 116 may be provided as well as a fourth window assembly 128 and its associated fourth selector interface 118.

In addition to being adapted for controlling vehicle window assemblies 122, 124, 126, 128, it should be appreciated that the exemplary embodiments described herein may be applicable to any type of vehicle aperture including a sunroof, rear vents, deck lid, convertible top, storage hatch, or another similarly controlled aperture.

Accordingly, exemplary embodiments enable a single mechanical window switch to be used for all variants of the window control assembly, regardless how many windows are to be controlled by the window control panel. In order for a single common design to facilitate applications to various vehicle configurations, the selection plate may be varied so as to accommodate each vehicle configuration. Since selector elements are not encumbered by the mechanical size constraints, different vehicle configurations can be easily accommodated. Further reductions in size may also be facilitated in embodiments wherein the selector elements employ capacitive or resistive touch technologies.

Figure 3:
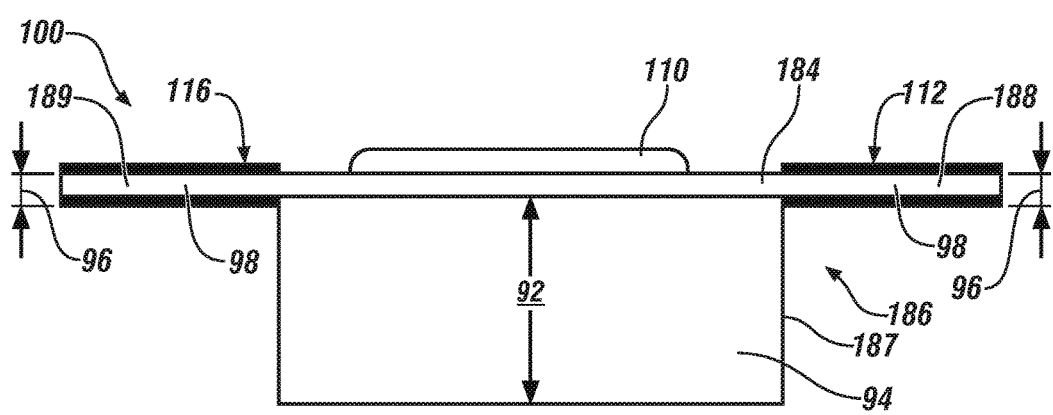
FIG. 3 is a drawing showing a side view of an exemplary vehicle window control panel.

For example, as shown in FIG. 3, which shows a side view of a control panel 100, a single common window control switch 110 is disposed between a pair of selector interfaces 112, 116 that are disposed on a top plate 184 of a housing 186. The housing 186 has a body 187 that encompasses the mechanical and electrical components of the single common window control switch 110. The top plate 184 is disposed on the body 187. The top plate 184 includes a first portion 188 and a second portion 189. The first portion 188 extends beyond the body 187 in a first direction such that the first portion 188 is configured as a first flange. The second portion 189 extends beyond the body 187 in a second direction that is disposed opposite the first direction such that second portion 189 is configured as a second flange. The first portion 188 receives the selector interface 112 and the second portion receives the selector interface 116. At the single common window control switch 110, a control switch depth 92 and control switch volume 94 is required. At each of the selector interfaces 112, 116, a significantly lower selector interface depth 96 and selector interface volume 98 is required. Typically, the selector interface depth 96 and selector interface volume 98 required for encompassing each of the selector switches 112, 116 are significantly less that the control switch depth 92 and control switch volume 94 required for encompassing each common window control switch 110. Therefore, by enabling full window control functionality with only a single window control switch 110, the invention provides for significant reductions in volume requirements within the housing. These reductions in volume requirements translate to reduced costs and improved packaging capabilities for designers of vehicle interiors.

Further still, exemplary embodiments provide intuitive and efficient control of window switch activation while reducing overall switch package size. Exemplary embodiments enable an operator to select the window or windows to be controlled/activated using selector elements enabled by capacitive or resistive touch technology, whereby a single mechanical switch is enabled to control any of the selectable windows or other apertures of the vehicle 120, whereby the required size for the window control assembly may be improved.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle window control panel for controlling a plurality of vehicle window assemblies, the vehicle window control panel comprising:
 a common window control switch configured for controlling operation of a window assembly when the window assembly occupies an active state;
 a plurality of selector interfaces electrically coupled to the common window control switch, each of said plurality of selector interfaces being associated with an associated window assembly and configured for selectively:
  (a) coupling the associated window assembly to the common window control switch so as to cause the associated window assembly to occupy an active state; and (b) decoupling the associated window assembly from the common window control switch so as to cause the associated window assembly to occupy an inactive state; and
 a housing having a body that encompasses the common window control switch and a top plate having a first portion that extends beyond the body in a first direction and a second portion that extends beyond the body in a second direction that is disposed opposite the first direction, upon which the plurality of selector interfaces are disposed.

2. A vehicle window control panel as in claim 1, wherein the common window control switch is a single window lifter switch.

3. A vehicle window control panel as in claim 2, wherein the single window lifter switch is disposed between two or more of selector interfaces.

4. A vehicle window control panel as in claim 1, wherein each of the plurality of selector interfaces comprises an indicator element configured for providing a visual indication of whether the associated window assembly occupies an active state.

5. A vehicle window control panel as in claim 4, wherein the indicator element comprises a led indicator configured to illuminate when the associated window assembly occupies an active state.

6. A vehicle window control panel as in claim 1, wherein the plurality of selector interfaces is disposed about the common window control switch so as to form a selector interface layout pattern and wherein the selector interface layout pattern is similar to an arrangement of the plurality of vehicle window assemblies.

7. A vehicle window control panel as in claim 1, wherein each selector interface of the plurality of selector interfaces is configured to automatically, following a predetermined period of time, decouple the window assembly from the common window control switch so as to cause the window assembly to occupy an inactive state.

8. A vehicle window control panel as in claim 1, wherein each selector interface of the plurality of selector interfaces is configured to automatically, following actuation of the common window control switch for a predetermined period of time, couple its associated window assembly to the common window control switch so as to cause its associated window assembly to occupy an active state.

9. A vehicle window control panel as in claim 1, wherein the window assembly comprises a driver's window, and wherein each selector interface of the plurality of selector interfaces is configured to retain the driver's window in an active state unless manually deactivated.

10. A vehicle window control panel as in claim 1, wherein each selector interface of the plurality of selector interfaces comprises a pressure sensitive touch switch.

11. A vehicle window control panel as in claim 1, wherein each selector interface of the plurality of selector interfaces comprises a capacitive switch.

12. A vehicle window control panel as in claim 1, wherein each selector interface of the plurality of selector interfaces comprises a mechanical switch.

13. A vehicle comprising:
 a first window assembly;
 a second window assembly;
 a housing having a body and a top plate disposed on the body, the top plate having a first portion that extends beyond the body in a first direction and a second portion that extends beyond the body in a second direction that is disposed opposite the first direction;

a common window control switch encompassed by the body of the housing, the common window control switch configured for controlling operation of the first window assembly when the first window assembly occupies an active state and the second window assembly when the second window assembly occupies an active state;

a first selector interface disposed on Hall the first portion of the top plate the first selector interface electrically coupled to the common window control switch, the first selector interface being associated with the first window assembly and configured for selectively: (a) coupling the first window assembly to the common window control switch so as to cause the first window assembly to occupy an active state; and (b) decoupling the first window assembly from the common window control switch so as to cause the first window assembly to occupy an inactive state; and a second selector interface electrically coupled to the common window control switch, the second selector interface being associated with the second window assembly and configured for selectively: (a) coupling the second window assembly to the common window control switch so as to cause the second window assembly to occupy an active state; and (b) decoupling the second window assembly from the common window control switch so as to cause the second window assembly to occupy an inactive state.

14. A vehicle as in claim 13, further comprising:

a third window assembly; and a third selector interface disposed on the second portion of the top plate the third selector interface electrically coupled to the common window control switch, the third selector interface being associated with the third window assembly and configured for selectively: (a) coupling the third window assembly to the common window control switch so as to cause the third window assembly to occupy an active state; and (b) decoupling the third window assembly from the common window control switch so as to cause the third window assembly to occupy an inactive state;

wherein the common window control switch is configured for controlling operation of the third window assembly when the third window assembly occupies an active state.

15. A vehicle as in claim 14, further comprising:

a fourth window assembly; and a fourth selector interface electrically coupled to the common window control switch, the fourth selector interface being associated with the fourth window assembly and configured for selectively: (a) coupling the fourth window assembly to the common window control switch so as to cause the fourth window assembly to occupy an active state; and (b) decoupling the fourth window assembly from the common window control switch so as to cause the fourth window assembly to occupy an inactive state;

wherein the common window control switch is configured for controlling operation of the fourth window assembly when the fourth window assembly occupies an active state.

16. A vehicle as in claim 13, wherein the common window control switch is a single window lifter switch.

17. A vehicle as in claim 16, wherein the single window lifter switch is disposed between two or more of selector interfaces.

18. A vehicle as in claim 13, wherein the first selector interface comprises an indicator element configured for providing a visual indication of whether the first window assembly occupies an active state and wherein the second selector interface comprises an indicator element configured for providing a visual indication of whether the second window assembly occupies an active state.

19. A vehicle as in claim 18, wherein the indicator element comprises a led indicator configured to illuminate when the first window assembly occupies an active state.

20. A vehicle as in claim 13, wherein the first selector interface and the second selector interface are disposed about the common window control switch so as to form a selector interface layout pattern and wherein the selector interface layout pattern is similar to an arrangement of the first window assembly and the second window assembly.

* * * * *